Figure 1:
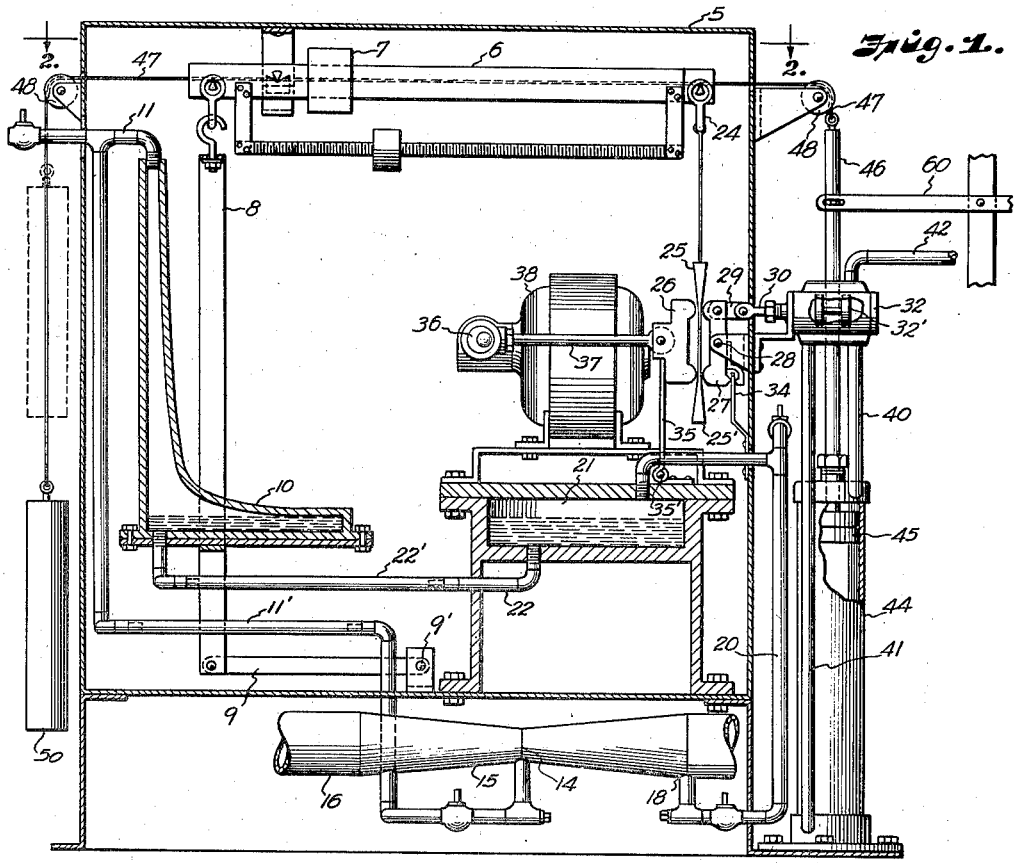

May 11, 1937.  E. E. HARPER  2,080,267

FLOW RESPONSIVE MEANS FOR FLUID FLOW APPARATUS

Filed May 27, 1935

INVENTOR;
E. E. Harper,

BY Chas W Gerard.
ATTORNEY.

Patented May 11, 1937

2,080,267

UNITED STATES PATENT OFFICE 2,080,267

FLOW-RESPONSIVE MEANS FOR FLUID-FLOW APPARATUS

Elmer E. Harper, Kansas City, Mo.

Application May 27, 1935, Serial No. 23,721

6 Claims. (Cl. 73—205)

The present invention relates to fluid-flow apparatus, and the primary object of the invention is to provide a flow-responsive means whereby the flow of a fluid through a conduit, orifice, or other apparatus, may be accurately measured, with a view to rendering such measurement available in the carrying out of other control or regulating functions.

One form of apparatus by which I have succeeded in accomplishing this purpose of the invention provides for the actual measurement, by means of appropriate scales mechanism, of the differential pressure head necessary to produce a flow of liquid, corresponding to the flow rate to be measured, through an orifice, tube or other form of conduit.

It is a further object of the invention to provide such a type of flow-responsive means as will enable the same to be effectually used in the actual control of other mechanical functions involved in apparatus of the character for which the invention is especially adapted, such as flow-rate control; the metering and recording of such rates; and also the control and regulation of chemical feeding devices, particularly where a chemical is to be added to water in direct proportion to the quantity of water treated, as represented by its rate of flow through a conduit or the like.

With the foregoing general objects in view, as well as various other and minor objects which will appear in the course of the detailed specification, the invention will now be described by reference to the accompanying drawing showing apparatus designed for practical operation in accordance with the principles of my improvements, after which the novel and patentable features of the invention will be particularly set forth and claimed.

In the drawing—

Figure 2:
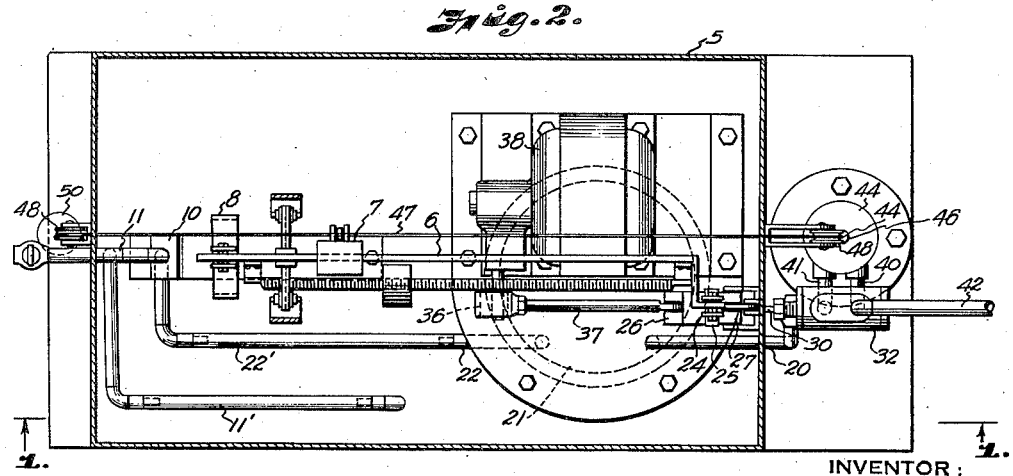

Figure 1 is a vertical sectional elevation—representing a section taken on the line 1—1 of Figure 2, and showing a flow-responsive means embodied in liquid-flow apparatus constructed to operate in accordance with the principles of the present invention; and Figure 2 is a plan view of said apparatus,—representing a section on the line 2—2 of Figure 1.

Referring now to the details of construction shown in said drawing, the illustrated form of apparatus comprises a suitable cabinet or framework 5 in which is mounted a scales mechanism including a scale beam 6 carrying a sliding poise 7 on one arm of the beam, while the other arm of the scale beam carries a frame 8 supporting a vessel or container 10 of special design as shown and provided with a pivotal anchor or stay link 9 fulcrumed at a fixed point 9' on the main framework. The top of this vessel 10 is provided with tube connections 11 (including a flexible portion 11') with the restricted throat portion 14 of a Venturi tube 15 forming part of a conduit 16—the flow through which (in a direction from right to left in Figure 1) represents the flow to be responded to and measured. To this Venturi tube 15 is also made a connection, at the beginning of one of its constricted portions as indicated by 18, by means of a pipe 20 leading to the top of a mercury well 21, the bottom of which is also connected by a tube 22 (having a flexible section 22') with the bottom of the vessel 10.

At the end of that arm of the beam 6 which carries the sliding poise 7, is attached a link 24 carrrying a pair of control elements 25 and 25', herein illustrated as of wedge-shape tapering toward each other, and suspended in a space or gap between an actuating member 26 and a lever 27 which is fulcrumed at 28 to the framework 5 and provided with a link 29 connected to the stem 30 of a double-acting pilot valve 32' mounted in a valve fittting 32. The member 26 and said lever 27 are each formed with projecting lobe portions for respective engagement with the control elements 25 and 25'; and the lever 27 is also engaged by a spring 34 for so actuating it as to retain the valve 32' in its normal or neutral position. The member 26 is supported by a link 35 (pivoted at 35') and is actuated (to impart to it a slight horizontal motion) by an eccentric rod 37 through a cam 36 driven from a suitable motor 38.

The valve 32' is provided with pipe connections 40 and 41 for controlling the flow of liquid from a supply pipe 42 to the top and bottom, respectively, of a hydraulic cylinder 44 in which operates a plunger 45, the rod 46 of which is connected by a cable 47 operating over suitable pulleys 48 and kept taut by a counterweight 50. The pulleys 48 are so mounted as to maintain a horizontal travel of the intermediate portion of said cable 47 along the exact center line of the knife edges of the scales mechanism; and said intermediate portion of the cable is connected with the poise 7 for moving it along the scale beam 6 in either direction, in response to vertical shifting movements of the plunger 50 in the hydraulic cylinder 44.

In carrying out the control function, the motor 38 and the actuating member 26 are in constant operation, but no movement is transmitted to the lever 27 and its valve unless the scales mechanism is out of balance, resulting in one or the other of the control elements 25, 25' being moved into operative position between said member 26 and the lever 27.

With the foregoing construction it will be apparent that when the scales system is so adjusted that, with no flow taking place through the Venturi tube 15, the scales will be in balanced condition,—then when a flow does take place through said tube 15 there will result an increase in pressure at the end 18 of the upstream cone portion of the tube, and a corresponding reduction in pressure at the throat 14. This variation in pressure will be transmitted through the connections 11 and 20 to the vessel 10 and well 21, and produce a fall of the mercury level in the well and a corresponding rise of the mercury level in the vessel 10.

This throws the scales mechanism out of balance, raising the right end of the scale beam 6 and lifting the control element 25' into the gap between the actuating member 26 and lower end of the lever 27, thereby causing said lever to be actuated to slowly open the valve 32'. This opens said valve to admit liquid under pressure through the pipe 40 to the top of the cylinder 44, for producing lowering movement of the plunger 45 and consequent movement of the poise 7 (as drawn by the cable 47) toward the right end of the scale beam 6, until the scales mechanism is again exactly in balance. Such re-balancing of the scales again lowers the control elements, so that the control element 25' is withdrawn from operative position between the member 26 and lever 27, and the lever 27 and valve 32' are returned to original position in which no flow of liquid takes place to either side of the plunger 45.

For any further increase in flow through the tube 15, a similar response will be made by the control mechanism as just described; whereas if the flow is either stopped or diminished, a reverse operation will take place, due to the unequal pressure conditions, as transmitted to the vessel 10 and the well 21, being such as to cause a flow of mercury away from the vessel 10 and into said well 21. This again unbalances the scales mechanism, lowering the right end of the scale beam 6 and also the control element 25 into the gap between the actuating member 26 and upper end of the lever 27, thereby causing said lever to be actuated for producing opening movement of the valve 32' in such a way as to admit liquid under pressure through the pipe 41 to the bottom of the cylinder 44. Thus the plunger 45 is actuated upwardly, with consequent movement of the poise toward the left until the scales mechanism is again in exact balance.

While a plain cylindrical type of vessel might be used for the vessel 10 which is supported by the scales, this would not produce a control in which the movement of the plunger 45 or the poise 7 would be in direct proportion to the flow of liquid through the Venturi tube 15. Bearing in mind the fact that the flow of liquid through said tube is proportional to the square root of the differential head producing the flow, it is desirable that equal increments (or decrements) in the rate of flow cause transfers of equal weights of the mercury between the vessel 10 and the well 21. Accordingly, with a vessel 10 so designed, approximately as shown, to accomplish this result, it is possible to graduate the scale beam with evenly spaced divisions, and the movement of the plunger 45 and the poise 7 will always be in direct proportion to the flow through the Venturi tube 15.

The advantages of such a flow-responsive mechanism over various devices in common use will be found quite noticeable. Where apparatus is used requiring floats for measuring the differential head, the fact that such measurements are usually made on liquids under pressure, so that stuffing boxes are necessary for transmitting and registering the float movements, offers a material objection on account of the friction due to the use of such stuffing boxes, which seriously interferes with the accuracy of the mechanism. Again, such float movements are relatively very small, and where relied upon to measure considerable variations in the flow rate by means of extremely slight movements of the float it becomes next to impossible to accomplish this with any dependable accuracy. Other forms of float-responsive devices make use of electrical contrivances with delicately balanced mechanism for responding to the float movements, which are however open to many objections from a mechanical standpoint. An attempt has also been made to use a delicately balanced U-tube containing mercury and provided with connections for transmitting changes in the differential pressure head to the tube and causing shifts in its position in response to such changes; such movements or shifts are in turn utilized to actuate a pointer for indicating the rate of the liquid flow taking place in the apparatus with which the device is used.

The present improved form of mechanism, however, provides a simple and accurate means for actually measuring, on appropriate scales mechanism, the differential pressure head required to produce the flow of fluid taking place, as well as responding to all changes in that pressure head, however small those changes may be. A further very important feature of the improved mechanism is its adaptability for operation in conjunction with efficient control connections, such as the operating means herein illustrated, or other suitable operating connections, in such a manner as to be capable of exerting considerable mechanical effort for the performance of other mechanical functions. For example, the movement of the plunger rod 46 may be utilized for the operation of a lever 60 or the like for the control of the operating means of chemical feeding apparatus forming a part of the same installation as is common with water purification systems. As a typical example of such adaptation, the control indicated would be for the purpose of controlling the rheostat of a motor illustrated as the driving means for the chemical feeding means in my copending application Ser. No. 23,720 filed May 27, 1935. The water to be treated in such a case flows through a Venturi tube, and if there were no water flowing through the tube, said plunger rod would be in its highest position, and thus operate through the rheostat control to stop the motor; on the other hand as the flow of water through the Venturi tube increased the speed of the motor would be proportionately increased to operate the chemical feeding mechanism at such a rate as to discharge chemical in direct proportion to the flow of water through the Venturi tube. Similarly, the improved mechanism may be conveniently adapted for operation as a flow rate controller, for controlling the flow of a fluid through a conduit at a predetermined rate; for this purpose the poise on the scale beam is manually adjusted to the required rate through the Venturi tube, and the hydraulic plunger (or other control connection) will then operate to control a valve regulating the flow through the Venturi tube, so that variations in said flow from the required rate will unbalance the scales and cause the control mechanism to operate the valve to govern the flow through the Venturi tube to whatever extent may be necessary to produce the required flow. The apparatus may also be operated as a meter, either to indicate by suitable graduations of the scale beam the rate of flow through the Venturi tube, or by the addition of well known auxiliary apparatus will also record the flow.

It may also be noted that while the apparatus has been illustrated as used particularly in connection with the flow of liquids it is obvious that the same is equally applicable for use in measuring or controlling the flow of gases.

It will therefore be seen that I have devised a practical and efficient flow-responsive and control construction for the carrying out of the various purposes of the invention, and one that is susceptible of wide and varied application for the control and regulation of other mechanical functions related to its use, including such operations as are herein specifically referred to, all following the same principle of using a scales mechanism for actually weighing the force induced by a flow of fluid through a pipe, tube or orifice. This force is generally expressed as the head (in terms of inches of water or mercury) required to produce the flow, but in the particular construction herein disclosed this force is measured by weighing mechanism instead of by linear measurement.

While the foregoing, therefore, represents particularly useful applications of the principle of my invention, I desire to be understood as reserving the right to make such modifications or applications thereof as may fairly be deemed to fall within the spirit and scope of the appended claims.

Having thus described my invention, what I claim as new and desire to secure by Letters Patent is:—

1. Flow-responsive means for fluid-flow apparatus comprising, in combination with a conduit for the fluid flow, means for causing said flow to develop a differential pressure head, scales mechanism, a variable load means associated with said scales mechanism and responsive to the differential pressure head produced by the fluid flow, an actuating means, a device for adjusting said scales mechanism to counteract the effect of said variable load means, and a control element responsive to fluctuations in said scales mechanism for constituting a variable drive element between said device and said actuating means.

2. Flow-responsive means for fluid-flow apparatus comprising, in combination with a conduit for the fluid flow, means for causing said flow to develop a differential pressure head, scales mechanism, means responsive to the differential pressure head produced by the fluid flow through said conduit for disturbing the balance of said scales mechanism, means operating automatically to maintain the scales mechanism in balanced relation, an actuating means, and a mechanical control element mounted independently of both said actuating means and automatic means and operating in response to fluctuations in said scales mechanism to transmit a varying drive action from said actuating means to said automatically operating means.

3. Flow-responsive means for fluid-flow apparatus comprising, in combination with a conduit for the fluid flow, means for causing said flow to develop a differential pressure head, scales mechanism including a scale beam carrying a sliding poise, means responsive to the differential pressure head produced by the fluid flow through said conduit for affecting the balance of said scale beam, automatic means for shifting said poise along the beam, an actuating means, and a control element mounted independently of both said actuating means and said automatic means and operating in response to fluctuating movements of the beam for transmitting a varying drive action from said actuating means to said automatic means.

4. Flow-responsive means for fluid-flow apparatus comprising, in combination with a conduit for the fluid flow, means for causing said flow to develop a differential pressure head, scales mechanism, a variable load means associated with said scales mechanism and responsive to the differential pressure head produced by the fluid flow, an actuating means, a device for adjusting said scales mechanism to counteract the effect of said variable load means, a control element responsive to fluctuations in said scales mechanism for constituting a variable drive element between said device and said actuating means, and operating means connected with and responsive to the operation of said device for external control purposes.

5. Flow-responsive means for fluid-flow apparatus comprising, in combination with a conduit for the fluid flow, means for causing said flow to develop a differential pressure head, scales mechanism including a scale beam carrying a sliding poise, means responsive to said differential pressure head for affecting the balance of said scale beam, an actuating means, an operating device connected with said poise for traversing the same along said beam, and a control element responsive to movements of said beam for constituting a variable drive element between said device and said actuating means.

6. Flow-responsive means for fluid-flow apparatus comprising, in combination with a conduit for the fluid flow, means for causing said flow to develop a differential pressure head, scales mechanism including a scale beam carrying a sliding poise, means responsive to said differential pressure head for affecting the balance of said scale beam, an actuating means, a fluid pressure device connected with said poise for traversing the same along said beam and provided with a control valve, and a control element responsive to movements of said beam for constituting a variable drive element between said device and said actuating means.

ELMER E. HARPER.